(12) United States Patent
Koo

(10) Patent No.: US 10,276,854 B2
(45) Date of Patent: Apr. 30, 2019

(54) RECHARGEABLE BATTERY COMPRISING SUB-TERMINAL AND RIVET-TERMINAL STRUCTURE

(71) Applicant: Samsung SDI Co., Ltd., Yongin-si, Gyeonggi-do (KR)

(72) Inventor: Min-Seok Koo, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 497 days.

(21) Appl. No.: 14/873,134

(22) Filed: Oct. 1, 2015

(65) Prior Publication Data
US 2016/0276645 A1  Sep. 22, 2016

(30) Foreign Application Priority Data
Mar. 16, 2015 (KR) .......................... 10-2015-0035941

(51) Int. Cl.
  *H01M 2/30* (2006.01)
  *H01M 2/06* (2006.01)
  *H01M 2/26* (2006.01)

(52) U.S. Cl.
  CPC .............. *H01M 2/30* (2013.01); *H01M 2/06* (2013.01); *H01M 2/26* (2013.01)

(58) Field of Classification Search
  CPC ........ H01M 2/02; H01M 2/0217; H01M 2/04; H01M 2/0417; H01M 2/0426; H01M 2/06; H01M 2/26; H01M 2/30; H01M 3/307; H01M 10/05
  See application file for complete search history.

(56) References Cited

U.S. PATENT DOCUMENTS

| 5,344,724 A | * | 9/1994 | Ozaki | H01M 4/133 429/231.3 |
| 6,132,900 A | * | 10/2000 | Yoshizawa | H01M 2/0426 29/623.1 |
| 2006/0263683 A1 | * | 11/2006 | Yoon | H01M 2/30 429/178 |
| 2011/0244308 A1 | * | 10/2011 | Byun | H01M 2/204 429/158 |
| 2011/0244309 A1 | * | 10/2011 | Byun | H01M 2/043 429/158 |

(Continued)

FOREIGN PATENT DOCUMENTS

| KR | 10-2004-0106319 A | 12/2004 |
| KR | 10-2011-0109843 A | 10/2011 |

(Continued)

*Primary Examiner* — Kenneth J Douyette
(74) *Attorney, Agent, or Firm* — Lewis Roca Rothgerber Christie LLP

(57) ABSTRACT

A rechargeable battery includes an electrode assembly, a case accommodating the electrode assembly, a cap plate coupled to the case, an electrode terminal within a terminal hole of the cap plate, and a lead tab connecting the electrode assembly to the electrode terminal, wherein the electrode terminal includes a plate terminal located outside of the cap plate and having a through-hole corresponding to the terminal hole, a sub-terminal extending into the through-hole and coupled to the plate terminal, and a rivet terminal penetrating the terminal hole, the rivet terminal being connected to the lead tab and being compression-molded to the sub-terminal.

10 Claims, 8 Drawing Sheets

(56) References Cited

U.S. PATENT DOCUMENTS

| | | | | |
|---|---|---|---|---|
| 2012/0058390 A1* | 3/2012 | Obayashi | ............... | H01M 2/30 |
| | | | | 429/179 |
| 2013/0224536 A1* | 8/2013 | Hattori | ................... | H01M 2/30 |
| | | | | 429/61 |
| 2013/0309559 A1 | 11/2013 | Shiraishi et al. | | |
| 2014/0023913 A1* | 1/2014 | Yokoyama | .......... | H01M 2/0217 |
| | | | | 429/179 |

FOREIGN PATENT DOCUMENTS

| | | |
|---|---|---|
| KR | 10-2014-0004125 A | 1/2014 |
| WO | WO 03/084694 A1 | 10/2003 |

\* cited by examiner

RECHARGEABLE BATTERY COMPRISING SUB-TERMINAL AND RIVET-TERMINAL STRUCTURE

CROSS-REFERENCE TO RELATED APPLICATION

This application claims priority to and the benefit of Korean Patent Application No. 10-2015-0035941 filed in the Korean Intellectual Property Office on Mar. 16, 2015, the entire contents of which are incorporated herein by reference.

BACKGROUND

1. Field

The present invention relates to a rechargeable battery in which an electrode terminal is made of different metals.

2. Description of the Related Art

A rechargeable battery differs from a primary battery in that it can be repeatedly charged and discharged, while the latter is incapable of being recharged. A low-capacity rechargeable battery is used in small portable electronic devices such as mobile phones, notebook computers, and camcorders, while a high-capacity rechargeable battery can be used as a power source for driving motors of a hybrid vehicle, an electric vehicle, and the like.

For example, a rechargeable battery typically includes: an electrode assembly for performing charging and discharging operations; a case in which the electrode assembly and an electrolyte solution are accommodated; a cap plate combined to an opening of the case; and electrode terminals provided in the cap plate to be connected to the electrode assembly (e.g., negative and positive electrode terminals).

The electrode assembly is formed by winding a negative electrode, a separator, and a positive electrode together in a jelly roll state. A current collector of the negative electrode is formed of a thin copper plate, while a current collector of the positive electrode is formed of a thin aluminum plate. Accordingly, the current collector of the negative electrode is connected to the negative terminal via a copper lead tab, and the positive electrode current collector is connected to the positive electrode terminal via an aluminum lead tab.

The negative and positive electrode terminals are made of aluminum to be connected to a bus bar. Accordingly, since the lead tab connected to the negative electrode is made of copper, the negative terminal includes a copper terminal and an aluminum terminal that are made of different metals.

In this case, the negative terminal is formed by joining the copper terminal connected to the lead tab and the aluminum terminal connected to the bus bar through friction welding. Such friction welding increases a manufacturing cost of the negative terminal and the rechargeable battery.

The above information disclosed in this Background section is only for enhancement of understanding of the background of the invention and therefore it may contain information that does not form the prior art that is already known in this country to a person of ordinary skill in the art.

SUMMARY

Embodiments of the present invention provide a rechargeable battery with an electrode terminal made of different metals and with a reduced manufacturing cost. In addition, a rechargeable battery is provided having an electrode terminal made of different metals and with enhanced bonding strength.

A rechargeable battery according to an exemplary embodiment of the present invention includes: an electrode assembly in which charging and discharging operations are performed; a case in which the electrode assembly is accommodated; a cap plate combined to an opening of the case; an electrode terminal provided in a terminal hole of the cap plate; and a lead tab connecting the electrode assembly to the electrode terminal. The electrode terminal includes: a plate terminal located outside of the cap plate and provided with a through-hole corresponding to the terminal hole; a sub-terminal inserted into the through-hole to be welded to the plate terminal; and a rivet terminal penetrating the terminal hole, with one side connected to the lead tab and the other side compression-molded to the sub-terminal to be combined thereto.

The sub-terminal may include: a first bottom and a first inner side wall that are depressed inward from their planar center portions to be connected to each other; a first outer side wall separated from the first inner side wall to be combined to the through-hole; and a first plate portion welded to the plate terminal by connecting the first inner side wall and the first outer side wall at an opposite side of the first bottom.

The plate terminal may form a stepped portion that extends farther than the through-hole, and the first plate portion may further include a first flange that extends farther than the first outer side wall and is located in the stepped portion to be welded thereto.

The rivet may terminal include: a second bottom compression-molded to the first bottom; a second inner side wall connected to the second bottom and then compression-molded to the first inner side wall; a second plate portion connected to the second inner side wall and then compression-molded to the first plate portion; and a second outer side wall connected to the second plate portion and then compression-molded to the first outer side wall.

The plate terminal and the sub-terminal may be made of aluminum, while the rivet terminal may be made of copper.

The electrode assembly may be formed by disposing a negative electrode and a positive electrode at opposite surfaces of a separator, wherein a current collector of the negative electrode may be formed of a thin copper plate, a current collector of the positive electrode may be formed of a thin aluminum plate, and the electrode terminal is connected to the negative electrode.

The rivet terminal may further include a second flange that is extended from the second outer side wall to be parallel to the cap plate and is connected to the lead tab.

The lead tab may be combined to the second outer side wall via a through-hole corresponding to the second outer side wall such that it is further connected to the second flange.

A first corner connecting the first bottom and the first inner side wall may be formed to be concave at an inner side of the first inner side wall and to be convex at an outer side thereof, and a second corner connecting the second bottom and the second inner side wall may be formed to be concave at an inner side of the second inner side wall and to be convex at an outer side thereof such that it is compression-molded to the first corner to be combined thereto.

A corner connecting the second inner side wall and the second plate portion and a corner connecting the second plate portion and the second outer side wall are formed to be concave at an inner side of the second plate portion and to be convex at an outer side thereof, and a corner connecting the first inner side wall and the first plate portion and a corner connecting the first plate portion and the first outer side wall are formed to be concave at an inner side of the first plate portion and to be convex at an outer side thereof such that they are compression-molded to the 31st and 32nd corners to be combined thereto.

The plate terminal and the sub-terminal may be made of aluminum while the rivet terminal may be formed of copper, such that they are compression-molded to the sub-terminal to be combined thereto.

According to the exemplary embodiment of the present invention, the electrode is formed as the plate terminal, the sub-terminal, and the rivet terminal to weld the sub-terminal to the plate terminal, and the sub-terminal and the rivet terminal made of different metals are compression-molded to be combined to each other, thereby forming the electrode terminal using different metals and yet reducing a cost. In addition, since the sub-terminal and the rivet terminal are compression-molded to be combined to each other, the electrode terminal can be made of different metals and yet provide enhanced bonding strength.

DETAILED DESCRIPTION

Figure 1:
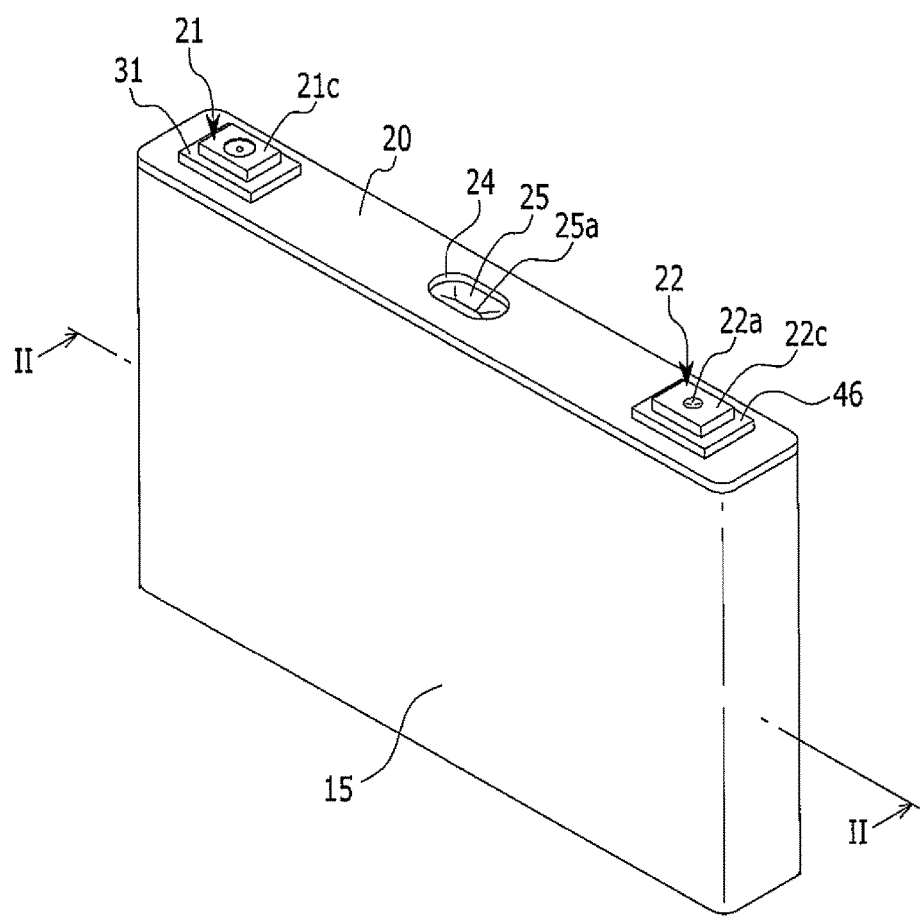
FIG. 1 is a perspective view of a rechargeable battery according to an exemplary embodiment of the present invention.

Embodiments of the present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. The drawings and description are to be regarded as illustrative in nature and not restrictive. Like reference numerals designate like elements throughout the specification.

Figure 2:
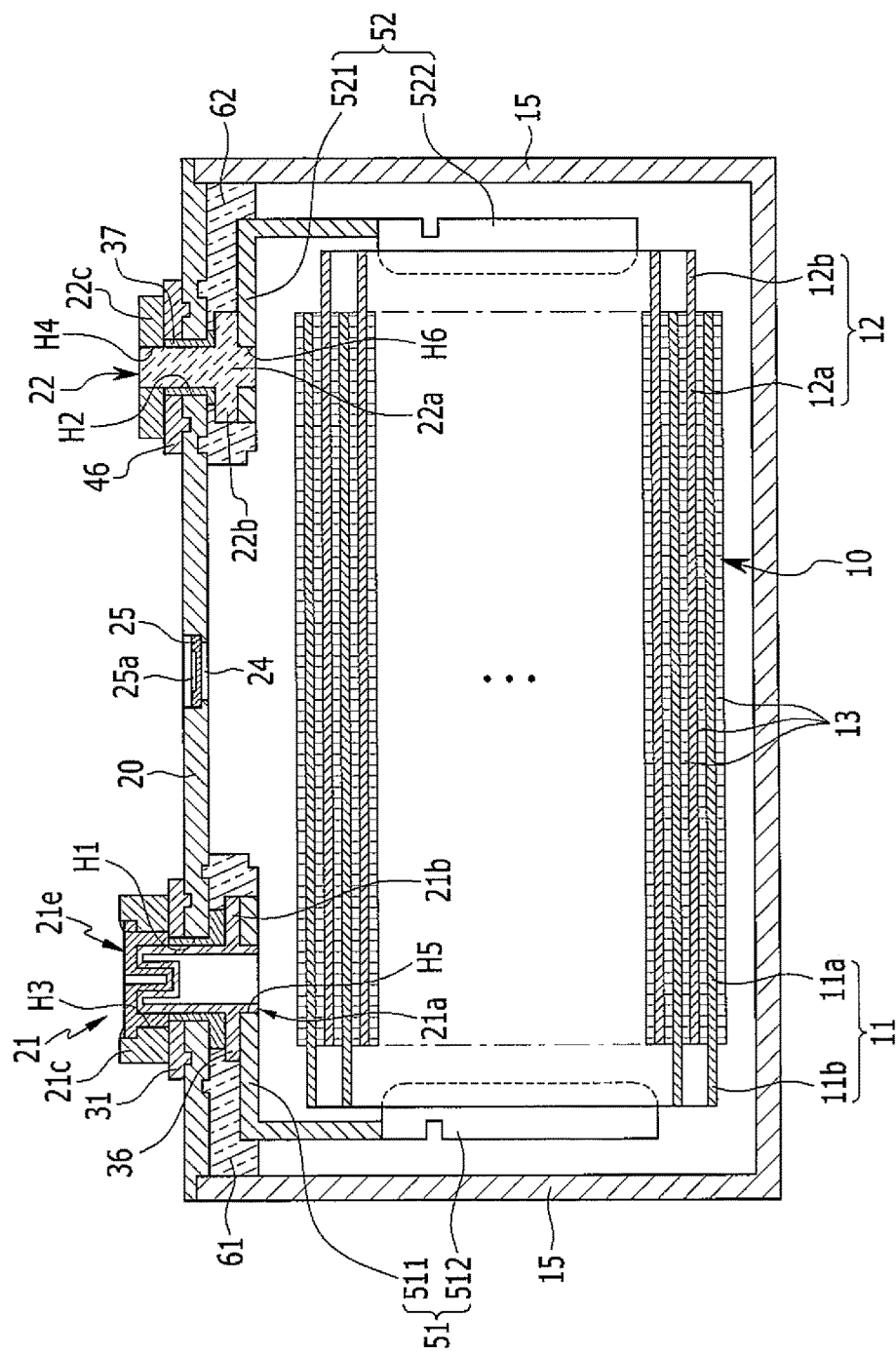
FIG. 2 is a cross-sectional view of FIG. 1 taken along the line II-II.

FIG. 1 is a perspective view of a rechargeable battery according to an exemplary embodiment of the present invention, and FIG. 2 is a cross-sectional view of FIG. 1 taken along the line II-II. Referring to FIGS. 1 and 2, the rechargeable battery according to the exemplary embodiment includes: an electrode assembly 10 in which a current is charged and discharged; a case 15 in which the electrode assembly 10 and an electrolyte solution are accommodated; a cap plate 20 combined to an opening of the case 15; electrode terminals provided in the cap plate 20 (e.g., negative and positive terminals 21 and 22); and lead tabs 51 and 52 connecting the negative and positive electrode terminals 21 and 22 to the electrode assembly 10.

For example, the electrode assembly 10 is formed by placing electrodes (e.g., negative and positive electrodes 11 and 12) at opposite surfaces of a separator 13, which serves as an insulator, and spirally winding the negative electrode 11, the separator 13, and the positive electrode 12 in a jelly-roll state.

Each of the negative and positive electrodes 11 and 12 includes coated regions 11a and 12a where an active material is coated on a current collector made of a thin metal plate, and uncoated regions 11b and 12b where an active material is not coated thereon and which are formed as exposed current collectors. The current collector of the negative electrode 11 is formed as a thin copper plate, while the current collector of the positive electrode 12 is formed as a thin aluminum plate.

The uncoated region 11b of the negative electrode 11 is formed at one end of the negative electrode 11 along the wound negative electrode 11. The uncoated region 12b of the positive electrode 12 is formed at one end of the positive electrode 12 along the wound positive electrode 12. In addition, the uncoated regions 11b and 12b are respectively located at opposite ends of the electrode assembly 10.

For example, the case 15 has a substantial cuboid shape to provide a space in which the electrode assembly 10 and an electrolyte solution are accommodated. The opening of the case 15 is formed at one side of the cuboid, allowing the electrode assembly 10 to be inserted into an internal space from the outside.

The cap plate 20 is provided in the opening of the case 15, and closes and seals the case 15. For example, the case 15 and the cap plate 20 may be welded to each other since they are made of an aluminum material. In other words, after inserting the electrode assembly 10 into the case 15, the cap plate 20 may be welded to the opening of the case 15.

In addition, the cap plate 20 includes one or more openings, and for example, includes terminal holes H1 and H2 and a vent hole 24. The negative and positive electrode terminals 21 and 22 are respectively provided in the terminal holes H1 and H2 of the cap plate 20 to be electrically coupled to the electrode assembly 10.

In other words, the negative and positive electrode terminals 21 and 22 are respectively electrically coupled to the negative and positive electrodes 11 and 12 of the electrode assembly 10 through the lead tabs 51 and 52. Accordingly, the electrode assembly 10 may be drawn out of the case 15 through the negative and positive electrode terminals 21 and 22.

The negative terminal 21 is made of different metals, while the positive electrode terminal 22 is made of a single metal. Since the current collectors of the negative and positive electrodes 11 and 12 are respectively formed as a thin copper plate and a thin aluminum plate, the lead tabs 51 and 52 may respectively be made of copper and aluminum.

The positive electrode terminal 22 includes a plate terminal 22c located outside of the cap plate 20 in accordance with the terminal hole H2, and a rivet terminal 22a electrically coupled to the lead tab 52 and riveted to the plate terminal 22c by penetrating the terminal hole H2.

An upper end of the rivet terminal 22a is inserted into a through-hole H4 of the plate terminal 22c after penetrating the terminal hole H2. The positive electrode terminal 22 further includes a second flange 22b that is integrally and widely formed with the rivet terminal 22a inside the cap plate 20.

A conductive top plate 46 located between the plate terminal 22c and the cap plate 20 allows the plate terminal 22c and the cap plate 20 to be electrically connected to each other. In other words, the cap plate 20 continues to be electrically coupled to the electrode assembly 10 and the lead tab 52 of the positive electrode 12.

By combining the top plate 46 and the plate terminal 22c to an upper end of the rivet terminal 22a and then riveting or welding the upper end thereof, the top plate 46 and the plate terminal 22c are joined to the upper end of the rivet terminal 22a. The plate terminal 22c is provided outside of the cap plate 20 with the top plate 46 therebetween.

A gasket 37 is provided between the rivet terminal 22a of the positive electrode terminal 22 and an inner surface of the terminal hole H2 of the cap plate 20 to seal and electrically insulate between the rivet terminal 22a and the cap plate 20.

The gasket 37 extends between the second flange 22b and an inner surface of the cap plate 20 to further seal and electrically insulate between the second flange 22b and the cap plate 20. In other words, the gasket 37 prevents leakage the electrolyte solution via the terminal hole H2 when installing the positive electrode terminal in the cap plate 20.

The lead tab 52 electrically couples the positive electrode terminal 22 with the positive electrode 12 of the electrode assembly 10. For example, the lead tab 52 includes a terminal connecting portion 521 connected to the positive electrode terminal 22, and an electrode connecting portion 522 connected to the uncoated region 12b of the electrode assembly 10.

In other words, the lead tab 52 is further combined to the second flange 22b of the rivet terminal 22a via a through-hole H6 to be connected thereto. By combining the terminal connecting portion 521 to a lower end of the rivet terminal 22a and then caulking the lower end thereof, the terminal connecting portion 521 is connected to the lower end of the rivet terminal 22a via the through-hole H6 while being supported by the second flange 22b.

An insulating member 62 is provided between the terminal connecting portion 521 of the lead tab 52 and the cap plate 20 to electrically insulate the terminal connecting portion 521 from the cap plate 20. In addition, one side of the insulating member 62 is combined to the cap plate 20 while the other side encloses the terminal connecting portion 521, the rivet terminal 22a, and the second flange 22b, thereby stabilizing a connection structure therebetween.

The negative terminal 21 includes a plate terminal 21c including the through-hole H3 corresponding to the terminal hole H1 and located outside of the cap plate 20, a sub-terminal 21e inserted into the through-hole H3 to be welded to the plate terminal 21c, and a rivet terminal 21a provided to penetrate the terminal hole H1. One side of the rivet terminal 21a is connected to the lead tab 51, while the other side is compression-molded to the sub-terminal 21e to be combined thereto.

Figure 3:
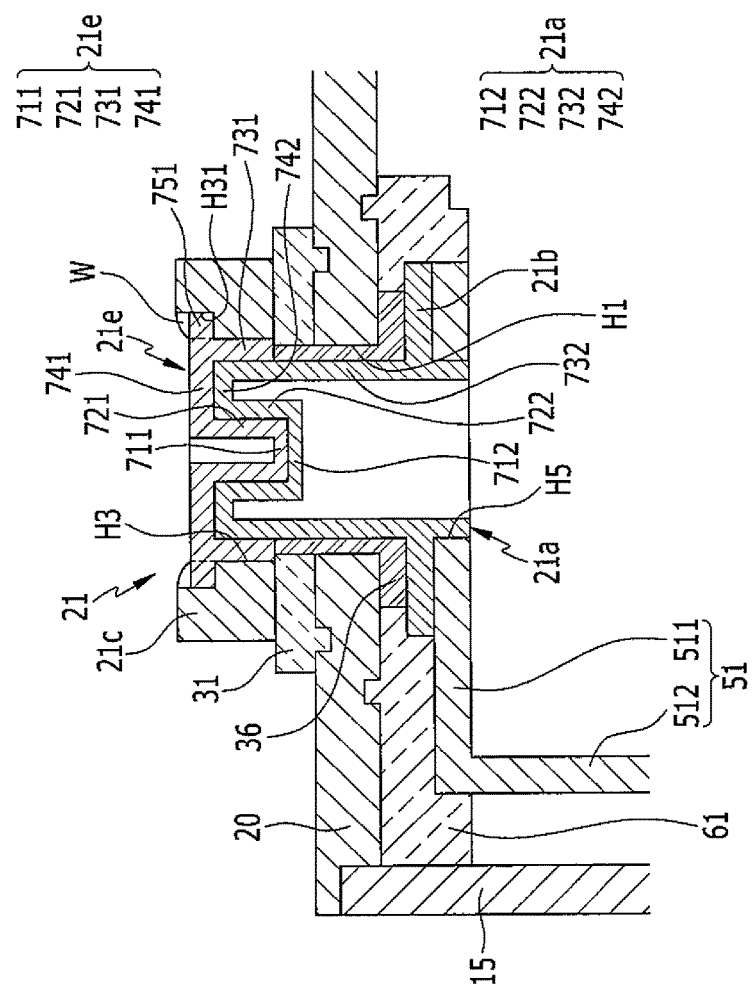
FIG. 3 is a detailed cross-sectional view of a negative terminal of FIG. 2.

FIG. 3 is a detailed cross-sectional view of the negative terminal of FIG. 2. Referring to FIGS. 2 and 3, in the negative terminal 21, the sub-terminal 21e includes a first bottom 711, a first inner side wall 721, a first outer side wall 731, and a first plate portion 741 that are compression-molded to the rivet terminal 21a to be combined thereto.

The first bottom 711 and the first inner side wall 721 are depressed inward from a planar center portion of the sub-terminal 21e, and are connected to each other. The first outer side wall 731 is combined to the through-hole H3 of the plate terminal 21c while being spaced from the first inner side wall 721. In one embodiment, the first plate portion 741 is welded to the plate terminal 21c by connecting the first inner side wall 721 and the first outer side wall 731 at an opposite side of the first bottom 711.

The plate terminal 21c forms a stepped portion H31 that extends farther than a width of the through-hole H3. Correspondingly, the first plate portion 741 of the sub-terminal 21e extends farther than the first outer side wall 731, and further includes a first flange 751 that is located in the stepped portion H31 to be welded thereto.

The rivet terminal 21a includes a second bottom 712, a second inner side wall 722, a second outer side wall 732, and a second plate portion 742 that are compression-molded to the first bottom 711 of the sub-terminal 21e. The second inner side wall 722 is connected to the second bottom 712 and compression-molded to the first inner side wall 721. The second plate portion 742 is connected to the second inner side wall 722 and compression-molded to the first plate portion 741. The second outer side wall 732 is connected to the second plate portion 742 and compression-molded to the first outer side wall 731.

In one embodiment, the plate terminal 21c and the sub-terminal 21e are made of aluminum to be welded (W) to each other, and the rivet terminal 21a is compression-molded to the sub-terminal 21e to be coupled thereto since it is made of copper.

The negative terminal 21 further includes a second flange 21b that is integrally formed with the rivet terminal 21a inside the cap plate 20. In other words, the second flange 21b extends from the second outer side wall 732 to be parallel to the cap plate 20, and is connected to the lead tab 51.

An external insulating member 31 located between the plate terminal 21c and the cap plate 20 electrically insulates the plate terminal 21c from the cap plate 20. In other words, the cap plate 20 continues to be insulated from the electrode assembly 10 and the lead tab 51 of the negative electrode 11.

By installing the insulating member 31 and the plate terminal 21c and then compression-molding the sub-terminal 21e and the rivet terminal 21a together, the insulating member 31 and the plate terminal 21c are fastened to the sub-terminal 21e and the upper end of the rivet terminal 21a. The plate terminal 21c is provided outside of the cap plate 20 while locating the insulating member 31 therebetween.

A gasket 36 is provided between the second outer side wall 732 of the rivet terminal 21a and an inner surface of the terminal hole H1 of the cap plate 20 to seal and electrically insulate between the second outer side wall 732 of the rivet terminal 21a and the cap plate 20.

The gasket 36 extends between the second flange 21b and the inner surface of the cap plate 20 to further seal and electrically insulate between the second flange 21b and the cap plate 20. In other words, the gasket 36 prevents leakage of the electrolyte solution via the terminal hole H1 when the negative terminal 21 is installed in the cap plate 31.

The lead tab 51 electrically couples the negative terminal 21 with the negative electrode 11 of the electrode assembly 10. For example, the lead tab 51 includes a terminal connecting portion 511 connected to the negative terminal 21, and an electrode connecting portion 512 connected to the uncoated region 11b of the electrode assembly 10.

The lead tab 51 is combined to the second outer side wall 732 via a through-hole H5 such that it is further connected to the second flange 21b of the rivet terminal 21a. By caulking a lower end of the second outer side wall 732 in the through-hole H5, the terminal connecting portion 511 is connected to the lower end of the second outer side wall 732 of the rivet terminal 21a while being supported by the second flange 21b.

An insulating member 61 is provided between the terminal connecting portion 511 of the lead tab 51 and the cap plate 20 to electrically insulate the terminal connecting portion 511 from the cap plate 20. In addition, one side of the insulating member 61 is combined to the cap plate 20 while the other side encloses the terminal connecting portion 511 and the second outer side wall 732 of the rivet terminal 21a and the second flange 21b, thereby stabilizing a connecting structure therebetween.

The vent hole 24 is closed and sealed by a vent plate 25 configured to discharge internal gas under certain conditions of the battery. Particularly, when the internal pressure of the rechargeable battery reaches a predetermined level, the vent plate 25 ruptures to expose the vent hole 24. The vent plate 25 is provided with a notch 25a that induces the rupture.

A manufacturing process of the negative terminal 21 will now be described. Hereinafter, in FIGS. 4 to 7, reference numerals are assigned only to completed components for ease of description.

Figure 4:
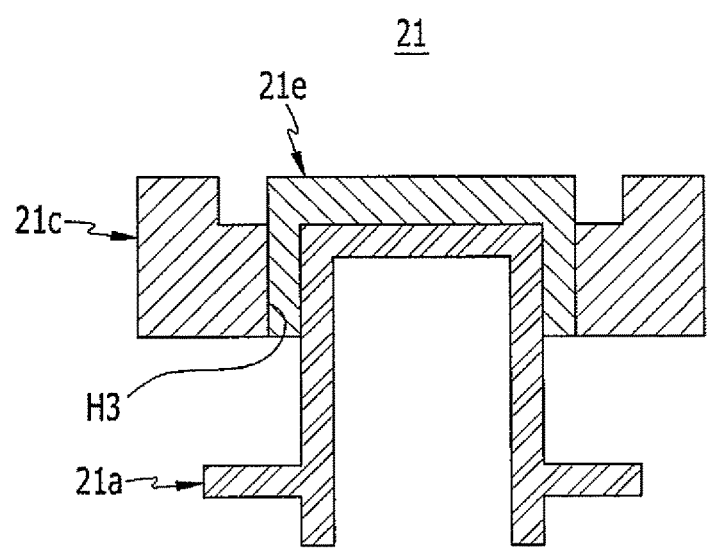
FIG. 4 is a cross-sectional view illustrating a state where the negative terminal of FIG. 3 is initially manufactured.

FIG. 4 is a cross-sectional view illustrating a state where a negative terminal of FIG. 3 is initially manufactured. Referring to FIG. 4, a partially processed sub-terminal 21e is combined to a drawing-processed rivet terminal 21a and is then placed inside a through-hole H3 of a plate terminal 21c.

A jig for compression-molding is located under the rivet terminal 21a, and a hammer providing a force for the compression-molding is located above the sub-terminal 21e such that it is raised or lowered. In other words, the sub-terminal 21e and the rivet terminal 21a are prepared to perform the compression-molding using the jig and the hammer.

Figure 5:
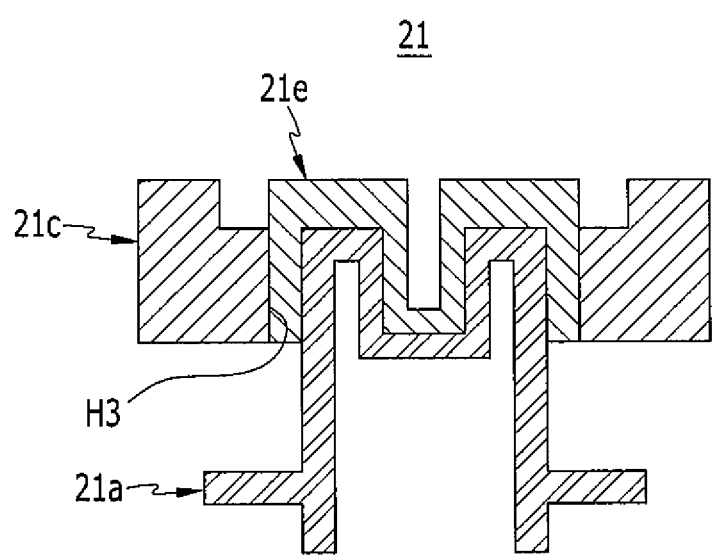
FIG. 5 is a cross-sectional view illustrating the state of FIG. 4 after being combined by using the compression-molding.

FIG. 5 is a cross-sectional view illustrating the state of FIG. 4 after being combined by the compression-molding. Referring to FIG. 5, in the ready state of FIG. 4, when a compression-molding process in which the hammer is lowered toward the jig is performed, the sub-terminal 21e and the rivet terminal 21a are depressed inwardly from the planar center portion, thereby being compression-molded to be combined to each other.

Figure 6:
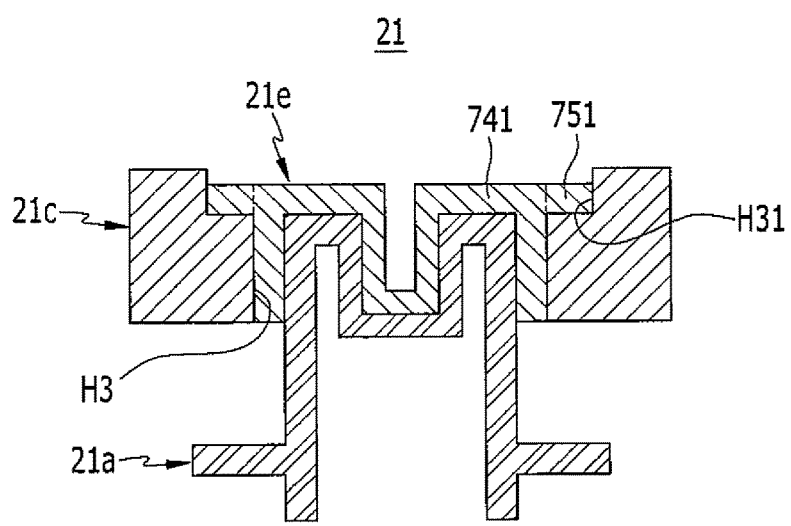
FIG. 6 is a cross-sectional view illustrating the state of FIG. 5 after being riveted.

FIG. 6 is a cross-sectional view illustrating the state of FIG. 5 after being riveted. Referring to FIG. 6, when a riveting process is performed in the compression-molded state of FIG. 5, a first flange 751 further extended from a first plate portion 741 of the sub-terminal 21e is riveted to a stepped portion H31 of a plate terminal 21c.

Figure 7:
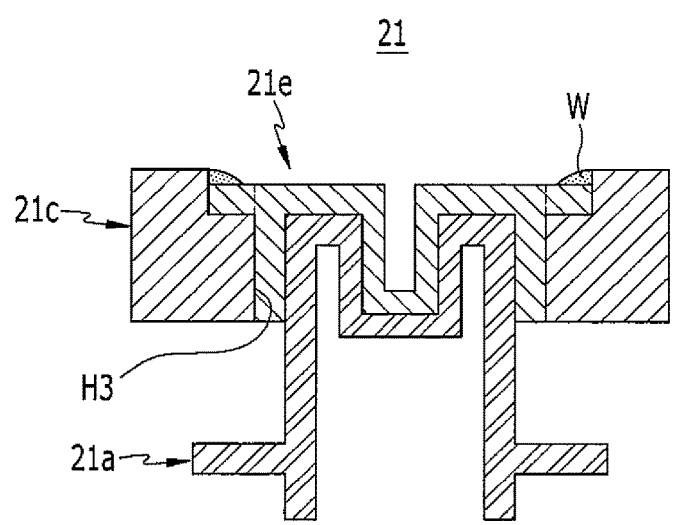
FIG. 7 is a cross-sectional view of the state of FIG. 6 after being welded.

FIG. 7 is a cross-sectional view of the state of FIG. 6 after being welded. Referring to FIG. 7, when a welding process is performed to the riveted state of FIG. 6, the first flange 751 is welded (W) to the stepped portion H31 of the plate terminal 21c. As such, the negative terminal 21 is completed and is thus completely installed in the terminal hole H1.

Figure 8:
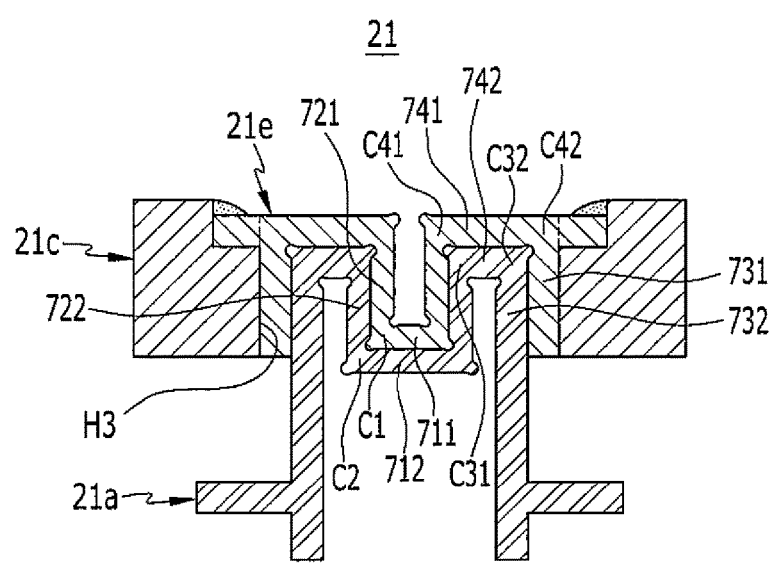
FIG. 8 is a cross-sectional view illustrating the assembled negative terminal manufactured by a process of FIGS. 4 to 7.

FIG. 8 is a cross-sectional view illustrating the assembled negative terminal manufactured by a process of FIGS. 4 to 7. For ease of description, the same reference numerals as those described above will be assigned. Referring to FIG. 8, the negative terminal 21 is completed by compression-molding the sub-terminal 21e and the rivet terminal 21a together and then welding the sub-terminal 21e to the plate terminal 21c.

Specifically, a first corner C1 connecting a first bottom 711 and a first inner side wall 721 is formed to be concave at an inner side of the first inner side wall 721 and to be convex at an outer side thereof. A second corner C2 connecting a second bottom 712 and a second inner side wall 722 is formed to be concave at an inner side of the second inner side wall 722 and to be convex at an outer side thereof. In addition, the second corner C2 has a high fastening force at the first and second bottoms 711 and 712 since it is compression-molded to the first corner C1 to be combined thereto.

In addition, a corner C31 connecting the second inner side wall 722 and a second plate portion 742 and a corner C32 connecting a second plate portion 742 and a second outer side wall 732 are formed to be concave at an inner side of the second plate portion 742 and to be convex at an outer side thereof.

A corner C41 connecting the first inner side wall 721 and the first plate portion 741 and a corner C42 connecting the first plate portion 741 and a first outer side wall 731 are formed to be concave at an inner side of the first plate portion 741 and to be convex at an outer side thereof. Substantially, the corner C42 is maintained to be flat since the first flange 751 is formed at an outer side of the first plate portion 741.

In addition, the corner C41 and the corner C42 have a high fastening force in the second and first plate portions 742 and 741 since they are compression-molded to the corner C31 and the corner C32, respectively, to be combined thereto.

The plate terminal 21c and the sub-terminal 21e are made of aluminum to be welded together. In addition, the rivet terminal 21a is made of copper and is thus stably compression-molded to the sub-terminal 21e of a different metal to be combined thereto. In the negative terminal 21, the sub-terminal 21e and the rivet terminal 21a may have high bonding strength since they are made of different metals.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

| Description of Symbols | |
| --- | --- |
| 10: electrode assembly | 11: negative electrode |
| 11a, 12a: coated region | 11b, 12b: uncoated region |
| 12: positive electrode | 13: separator |
| 15: case | 20: cap plate |
| 21, 22: negative, positive electrode terminal | 21a, 22a: rivet terminal |
| 21b, 22b: second flange | 21c, 22c: plate terminal |
| 21e: sub-terminal | 24: vent hole |
| 25: vent plate | 25a: notch |
| 31: external insulating member | 36, 37: gasket |
| 46: top plate | 51, 52: lead tab |
| 61, 62: insulating member | 511, 521: terminal connecting portion |
| 512, 522: electrode connecting portion | 711, 712: first, second bottom |
| 721, 722: first, second inner side wall | 731, 732: first, second outer side wall |
| 741, 742: first, second plate portion | 751: first flange |
| H1, H2: terminal hole | H3, H4, H5, H6: through-hole |
| H31: stepped portion | |

What is claimed is:

1. A rechargeable battery comprising:
   an electrode assembly;
   a case accommodating the electrode assembly;
   a cap plate coupled to the case;
   an electrode terminal penetrating a terminal hole of the cap plate; and
   a lead tab connecting the electrode assembly to the electrode terminal, wherein the electrode terminal comprises:

a plate terminal located outside of the cap plate and having a through-hole corresponding to the terminal hole;

a sub-terminal extending into the through-hole and coupled to the plate terminal; and a rivet terminal penetrating the terminal hole, the rivet terminal being connected to the lead tab and being compression-molded to the sub-terminal, wherein the sub-terminal includes:

a first bottom and a first inner side wall that are depressed inward from a planar center portion of the sub-terminal, the first bottom and the first inner side wall being connected to each other;

a first outer side wall spaced from the first inner side wall to be combined to the plate terminal within the through hole; and a first plate portion connected to the first inner side wall and the first outer side wall and coupled to the plate terminal.

2. The rechargeable battery of claim 1, wherein the plate terminal forms a stepped portion that extends past an edge of the through-hole, and wherein the first plate portion further includes a first flange that extends past an edge of the first outer side wall and is located in the stepped portion.

3. The rechargeable battery of claim 1, wherein the rivet terminal includes:

a second bottom compression-molded to the first bottom;

a second inner side wall connected to the second bottom and compression-molded to the first inner side wall;

a second plate portion connected to the second inner side wall and compression-molded to the first plate portion; and a second outer side wall connected to the second plate portion and compression-molded to the first outer side wall.

4. The rechargeable battery of claim 3, wherein the plate terminal and the sub-terminal comprise aluminum and the rivet terminal comprises copper.

5. The rechargeable battery of claim 4, wherein the electrode assembly comprises a negative electrode and a positive electrode at opposite surfaces of a separator, wherein a current collector of the negative electrode is formed of a thin copper plate, wherein a current collector of the positive electrode is formed of a thin aluminum plate, and wherein the electrode terminal is connected to the negative electrode.

6. The rechargeable battery of claim 3, wherein the rivet terminal further includes a second flange that extends from the second outer side wall in a direction parallel to the cap plate and is connected to the lead tab.

7. The rechargeable battery of claim 6, wherein the lead tab is coupled to the second outer side wall via a through-hole corresponding to the second outer side wall such that it is further connected to the second flange.

8. The rechargeable battery of claim 3, wherein a first corner connecting the first bottom and the first inner side wall is concave at an inner side of the first inner side wall and convex at an outer side thereof, and a second corner connecting the second bottom and the second inner side wall is concave at an inner side of the second inner side wall and convex at an outer side thereof such that it is compression-molded to the first corner and coupled thereto.

9. The rechargeable battery of claim 8, wherein a corner connecting the second inner side wall and the second plate portion is concave at an inner side of the second plate portion and is convex at an outer side thereof, and is compression molded to a corner connecting the first inner side wall and the first plate portion that is concave at an inner side of the first plate portion and is convex at an outer side thereof, and wherein a corner connecting the second plate portion and the second outer side wall is concave at an inner side of the second plate portion and is convex at an outer side thereof, and is compression molded to a corner connecting the first plate portion and the first outer side wall that is concave at an inner side of the first plate portion and is convex at an outer side thereof.

10. The rechargeable battery of claim 9, wherein the plate terminal and the sub-terminal comprise aluminum and the rivet terminal comprises copper, and wherein the plate terminal and the sub-terminal are compression-molded together.

* * * * *